United States Patent [19]

Ohzawa et al.

[11] Patent Number: 5,398,136
[45] Date of Patent: Mar. 14, 1995

[54] PHOTOGRAPHIC LENS SYSTEM

[75] Inventors: Soh Ohzawa; Junji Hashimura, both of Sakai, Japan

[73] Assignee: Minolta Co., Ltd., Osaka, Japan

[21] Appl. No.: 994,103

[22] Filed: Dec. 21, 1992

[30] Foreign Application Priority Data

Dec. 24, 1991 [JP] Japan .................. 3-357338

[51] Int. Cl.$^6$ .................. G02B 13/18; G02B 13/04; G02B 9/58; G02B 9/60
[52] U.S. Cl. .................. 359/714; 359/715; 359/753; 359/770; 359/782
[58] Field of Search ............... 359/749, 750, 751, 752, 359/753, 761, 770, 782, 714, 715

[56] References Cited

U.S. PATENT DOCUMENTS

| | | | |
|---|---|---|---|
| 4,576,448 | 3/1986 | Ikari | 350/465 |
| 4,720,183 | 1/1988 | Dilworth | 359/751 |
| 4,936,661 | 6/1990 | Betensky | 359/692 |
| 5,002,372 | 3/1991 | Tamamura | 350/418 |
| 5,078,481 | 1/1992 | Nakayama | 359/680 |

FOREIGN PATENT DOCUMENTS 55-45007 3/1980 Japan .
2238417 9/1990 Japan .

Primary Examiner—Scott J. Sugarman
Attorney, Agent, or Firm—Price, Gess & Ubell

[57] ABSTRACT

A single focal length lens system has a first negative lens element and a last negative lens element. The first negative lens element is disposed at an object side end of the lens system and the object side surface thereof is concave. The last negative lens element is disposed at an image side end of the lens system. The lens system fulfills the following condition:

$$0.3 < \frac{\phi 1}{\phi f} < 1.7$$

wherein $\phi f$ represents the refractive power of the first negative lens element; and $\phi 1$ represents the refractive power of the last negative lens element.

18 Claims, 13 Drawing Sheets

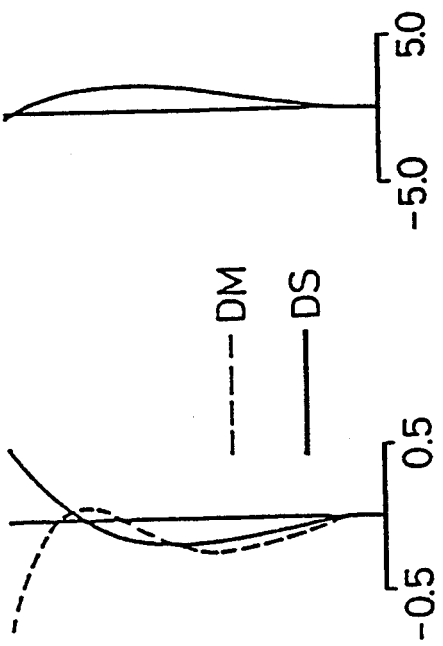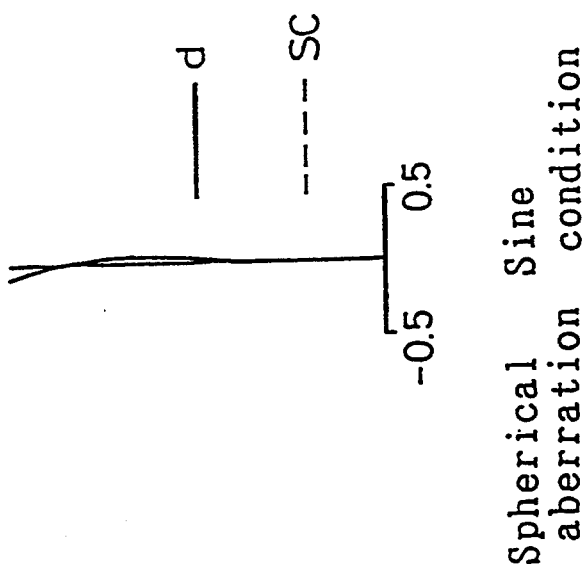

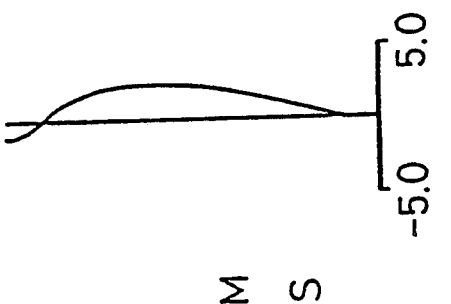
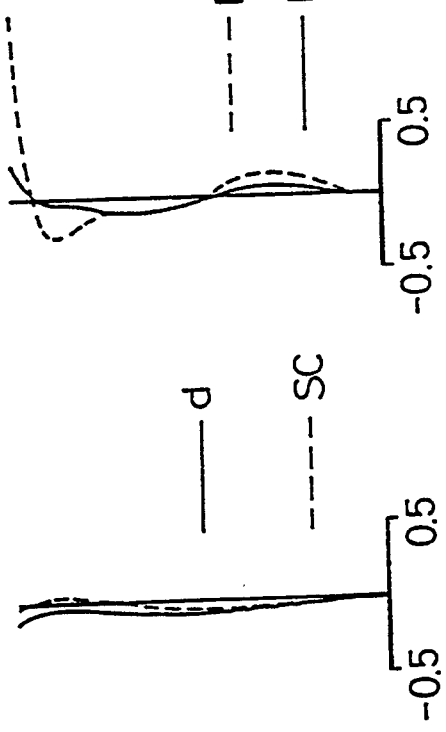

PHOTOGRAPHIC LENS SYSTEM

BACKGROUND OF THE INVENTION

1. Field of the Invention

The present invention relates to a photographic lens system, and more specifically, to a wide-angle photographic lens system optimum for a camera capable of exposing at a panoramic size format.

2. Description of the Prior Art

In recent years, there has been a demand for wider-angle lens systems for lens shutter cameras, more particularly for cameras capable of exposing at a panoramic size format.

As conventional wide-angle photographic lens systems, ones are known which are made compact by employing lens arrangements of a retro focus type frequently used for single-lens reflex cameras, of a symmetrical type such as a topogon, and of a telephoto type (a type where, with respect to an aperture, an object side lens unit has a positive refractive power and an image side lens unit has a negative refractive power) such as the one disclosed in Japanese laid-open Patent Application No. S58-219509.

However, the retro focus type lens system is not suitable for reducing the total length of the lens system since the back focal length is large, while concerning the symmetrical type lens system such as the topogon, since it is difficult to correct field curvature in a compact lens system having a large diameter, it is difficult to realize a high performance. In the telephoto type lens system where the lens unit arranged in front of the aperture generally includes three lens elements consisting of a positive, a negative and a positive lenses (this type is called a triplet type), since the deterioration of image plane quality (that is, field curvature and astigmatism in the periphery of the image plane) cannot sufficiently be corrected by use of the lens unit arranged behind the aperture if the angle of view is increased, it is after all difficult to realize a high performance.

SUMMARY OF THE INVENTION

An object of the present invention is to provide a compact photographic lens system having a high performance and a wider angle of view.

BRIEF DESCRIPTION OF THE DRAWINGS

This and other objects and features of this invention will become clear from the following description, taken in conjunction with the preferred embodiments with reference to the accompanied drawings in which:

FIGS. 8A, 8B, and 8C show graphic representations of aberrations of the fourth embodiment of the present invention;

FIGS. 12A, 12B, and 12C show graphic representations of aberrations of the sixth embodiment of the present invention.

DESCRIPTION OF THE PREFERRED EMBODIMENTS

Figure 1:
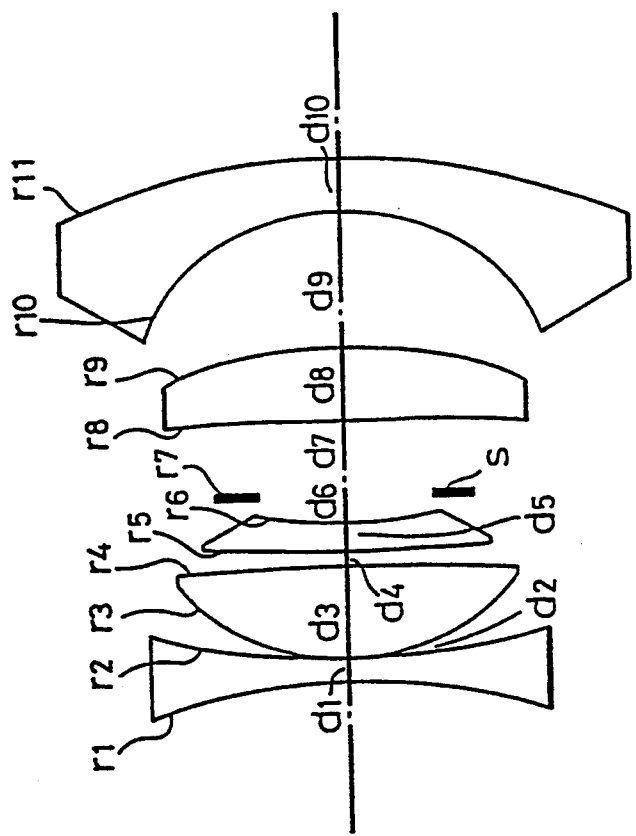
FIG. 1 is a cross-sectional view showing a lens arrangement of a first embodiment of the present invention.
Figure 2:
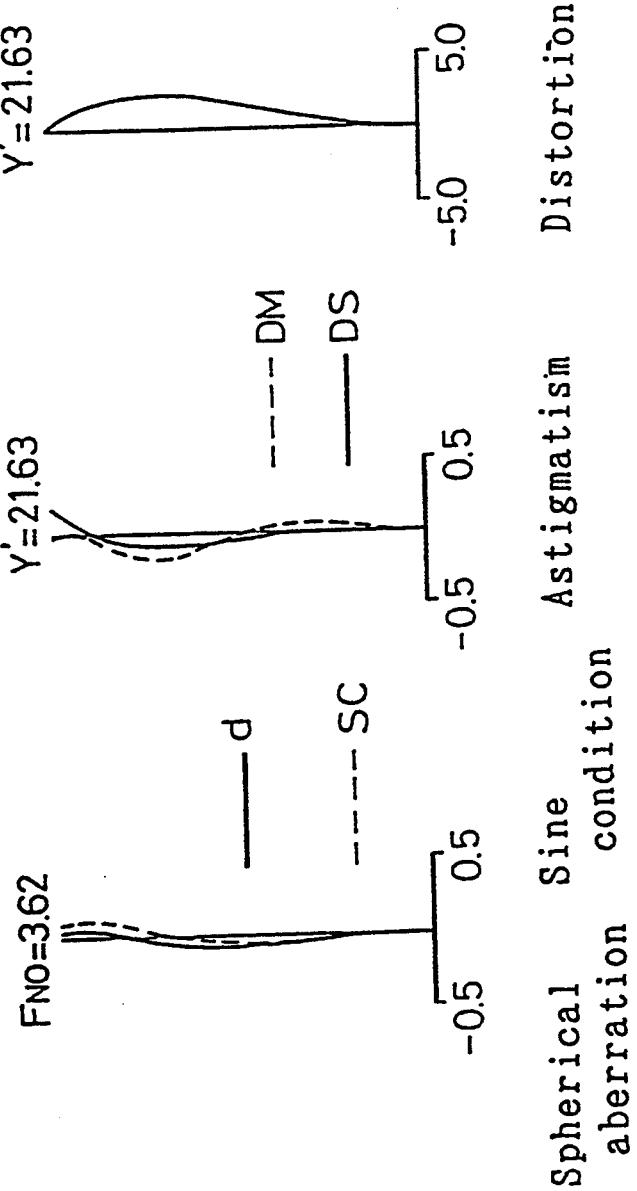
FIGS. 2A, 2B, and 2C show graphic representations of aberrations of the first embodiment of the present invention.
Figure 3:
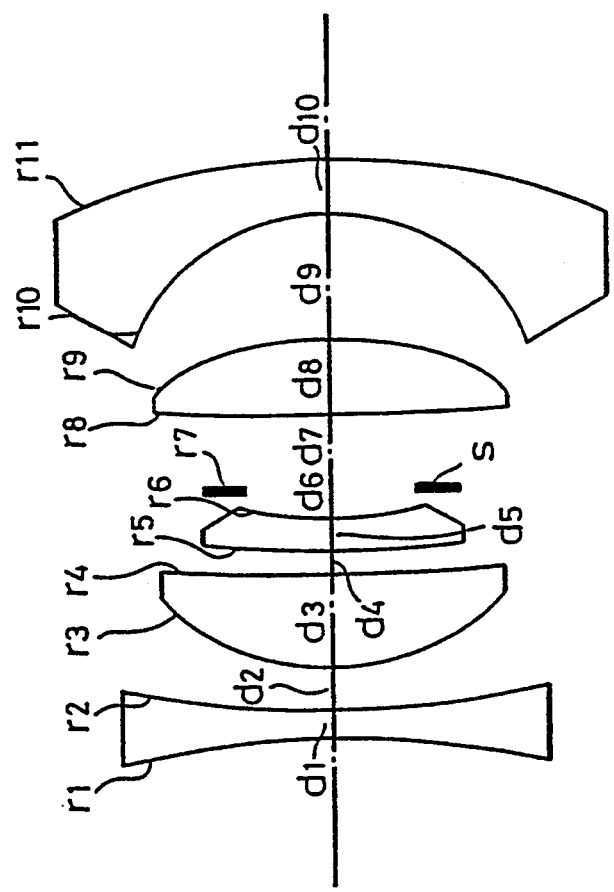
FIG. 3 is a cross-sectional view showing a lens arrangement of a second embodiment of the present invention.
Figure 4:
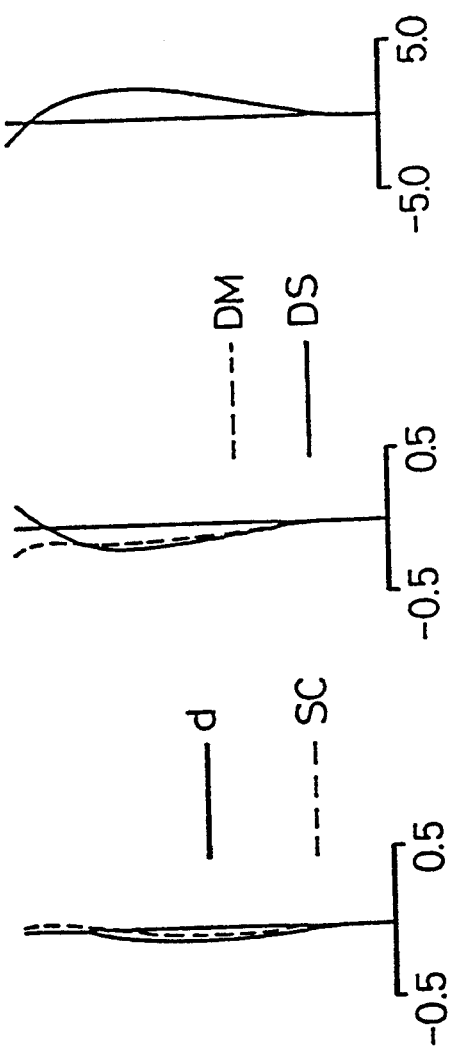
FIGS. 4A, 4B, and 4C show graphic representations of aberrations of the second embodiment of the present invention.
Figure 5:
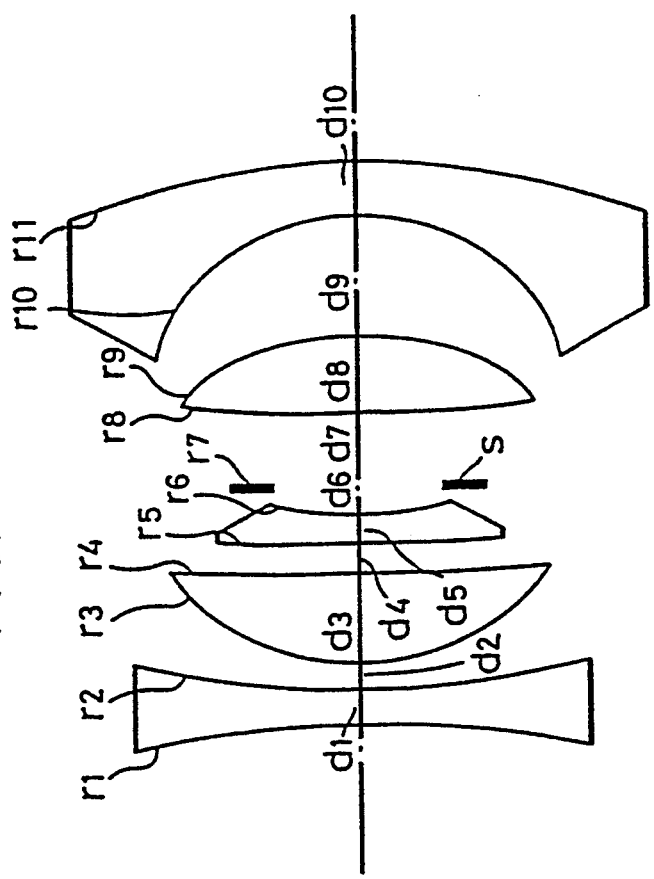
FIG. 5 is a cross-sectional view showing a lens arrangement of a third embodiment of the present invention.
Figure 6:
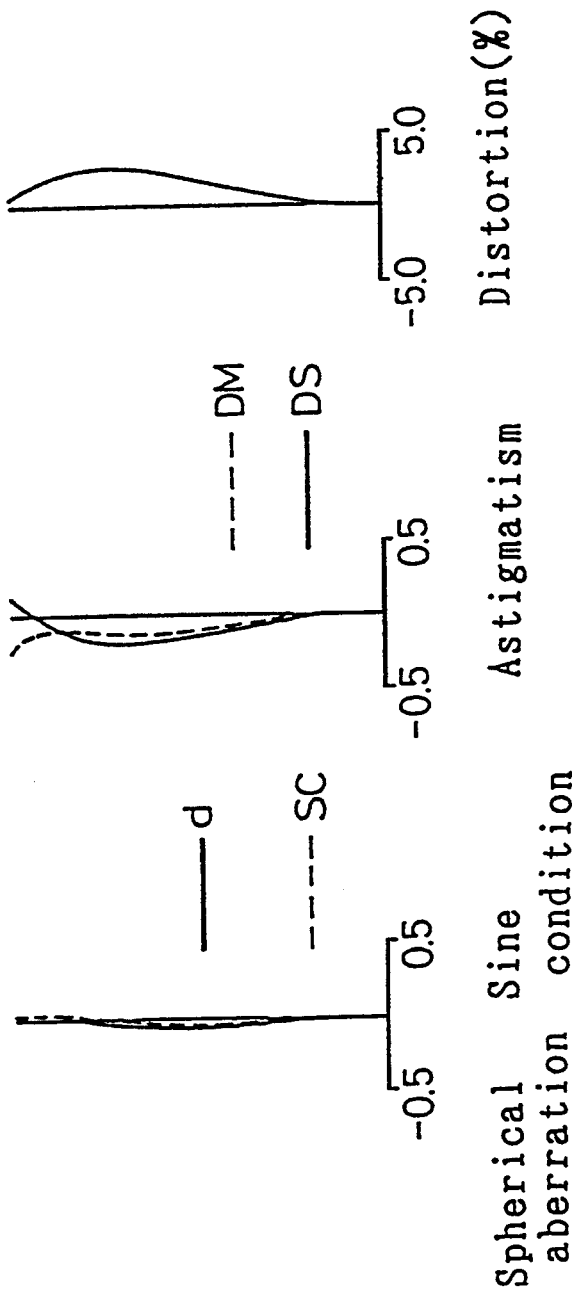
FIGS. 6A, 6B, and 6C show graphic representations of aberrations of the third embodiment of the present invention.
Figure 7:
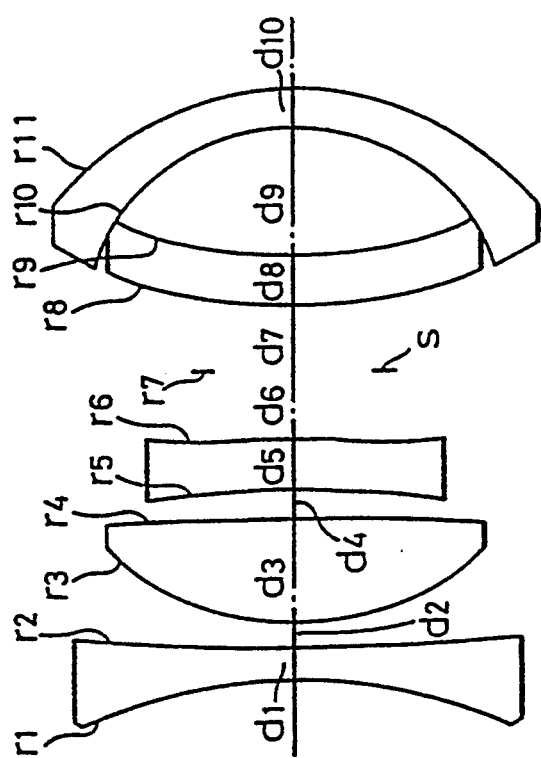
FIG. 7 is a cross-sectional view showing a lens arrangement of a fourth embodiment of the present invention.
Figure 9:
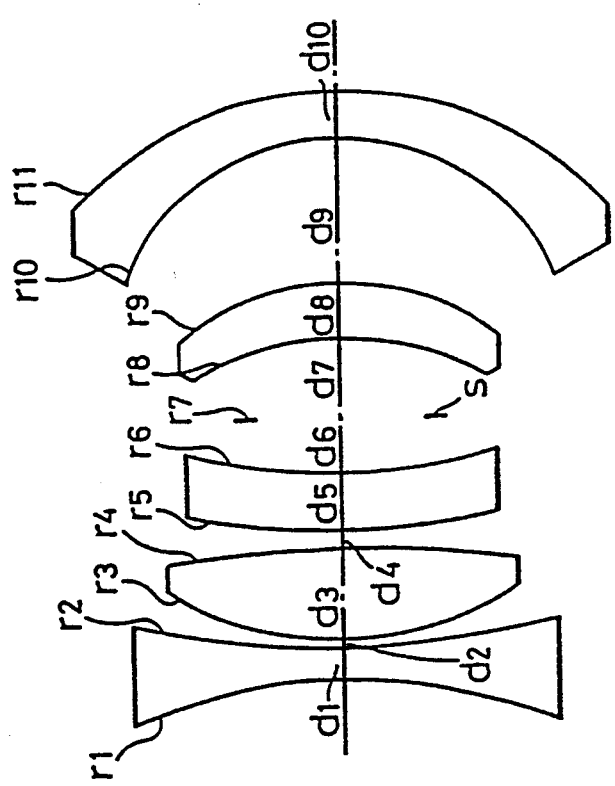
FIG. 9 is a cross-sectional view showing a lens arrangement of a fifth embodiment of the present invention.
Figure 10:
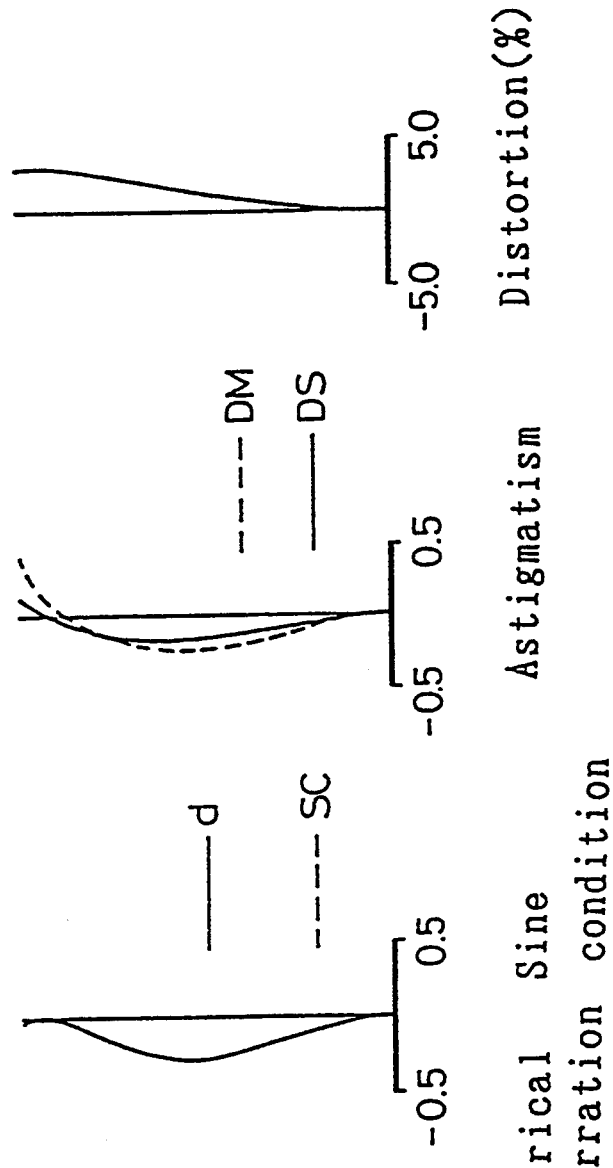
FIGS. 10A, 10B, and 10C show graphic representations of aberrations of the fifth embodiment of the present invention.
Figure 11:
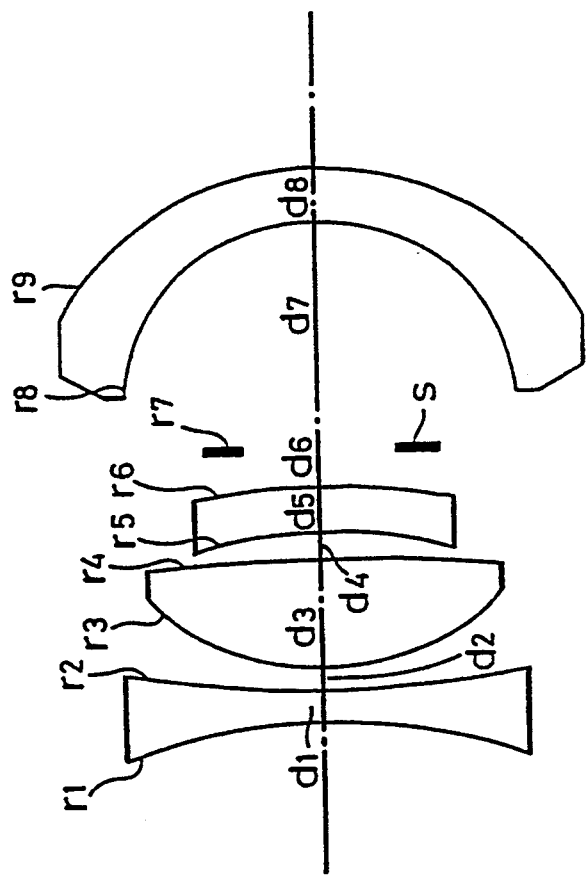
FIG. 11 is a cross-sectional view showing a lens arrangement of a sixth embodiment of the present invention.

According to the present invention, a photographic lens system has a negative lens element concave to the object side as the first lens element counted from the object side, has a negative lens element as the most image side lens element, and fulfills the following condition (1):

$$0.3 < \frac{\phi 1}{\phi f} < 1.7 \tag{1}$$

where $\phi f$ is a refractive power of the first lens element counted from the object side (hereinafter referred to as first lens) and $\phi 1$ is a refractive power of the most image side lens element (hereinafter referred to as last lens).

The condition (1) shows a relationship between the negative refractive power of the first lens and the negative refractive power of the last lens. When the upper limit of the condition (1) is exceeded, the total length of the lens system increases. As a result, it is impossible to realize a compact lens system. When the lower limit of the condition (1) is exceeded, it is impossible to sufficiently restrain field curvature generated by the first lens.

Further, the following conditions (2) and (3) are desirably fulfilled:

$$-2.8 < \frac{\phi F}{\phi f} < -0.1 \tag{2}$$

$$-1.2 < \frac{\phi R}{\phi F} < 0.4 \tag{3}$$

where $\phi F$ is a refractive power of a lens unit arranged in front of an aperture (hereinafter referred to front lens unit) and $\phi R$ is a refractive power of a lens unit arranged behind the aperture (hereinafter referred to as rear lens unit).

The condition (2) shows a relationship between the positive refractive power of the front lens unit and the negative refractive power of the first lens. When the upper limit of the condition (2) is exceeded, the total length of the lens system increases. As a result, it is impossible to realize a compact lens system. When the lower limit of the condition (2) is exceeded, an excessive amount of aberrations are introduced by the front lens unit, so that it is impossible for the rear lens unit to sufficiently restrain the aberrations.

The condition (3) shows a relationship between the refractive power of the front lens unit and the refractive power of the rear lens unit. When the upper limit of the condition (3) is exceeded, the total length increases. As a result, it is impossible to realize a compact lens system. When the lower limit of the condition (3) is exceeded, the refractive power of the front lens unit is so strong that it is difficult to correct aberrations.

As to the lens arrangement, the front lens unit desirably includes two lens elements consisting of, from the object side, a negative lens concave to the object side and a positive lens. Further desirably, the front lens unit includes three lens elements consisting of, from the object side, a negative lens concave to the object side, a positive lens and a negative or weakly positive lens.

The rear lens unit desirably includes one lens element which is a negative meniscus lens concave to the object side. Further desirably, the rear lens unit includes two lens elements consisting of, from the object side, a positive lens and a negative meniscus lens concave to the object side.

In order to realize a compact, high-performance lens system, it is desirable to employ at least one aspherical surface.

In the front lens unit, it is desirable to employ for a lens element proximate to the aperture an aspherical surface whose negative refractive power increases gradually from the center to the edge along the height. With this arrangement of an aspherical surface, since the first lens has a negative refractive power, it is possible to correct coma and an inclination of spherical aberration toward the under side due to a strong positive refractive power of the second lens element counted from the object side (hereinafter referred to as second lens).

In the rear lens unit, an aspherical surface is employed for the positive lens element or for the most image side surface. This arrangement of an aspherical surface prevents rapid deterioration of astigmatism toward the over side introduced in the vicinity of the most off-axial portion which deterioration is a problem in wide-angle lenses. Since the role of the aspherical surface is different between in the front lens unit and in the rear lens unit, it is desirable to employ an aspherical surfaces in each of the front and rear lens units.

Generally, all the units are moved for focusing. According the arrangement of the present invention, however, since the refractive power of the front lens unit is sufficiently strong, only a small movement amount is necessary to obtain an excellent wide-angle condition even when only the front lens unit is moved.

Subsequently, conditions will be explained which are desirably fulfilled by a lens system comprising a front lens unit including three lens elements consisting of, from the object side, a negative, a positive and a negative lenses or a negative, a positive and a positive lenses and a rear lens unit including two lens elements consisting of, from the object side, a positive and a negative lenses or one lens element which is a negative lens.

The front lens unit desirably fulfills the following condition (4):

$$-1.2 < \frac{\phi 3}{\phi} < 0.5 \quad (4)$$

where $\phi 3$ is a refractive power of the third lens element counted from the object side (hereinafter referred to third lens) and $\phi$ is a refractive power of the entire lens system.

When the lower limit of the condition (4) is exceeded, the positive refractive power of the second lens is so strong that it is difficult to restrain spherical aberration. When the upper limit of the condition (4) is exceeded, the total length of the lens system increases. As a result, it is impossible to realize a compact lens system.

Further, the front lens unit desirably fulfills the following condition (5):

$$1.6 < Nd2 \quad (5)$$

where Nd2 is a refractive index of the second lens.

When the lower limit of the condition (5) is exceeded, the Petzval sum increases, so that field curvature increases.

Since it is necessary to restrain axial chromatic aberration to some extent between the first and second lenses, the following condition (6) is desirably fulfilled:

$$10 < \nu 2 - \nu 1 < 30 \quad (6)$$

where $\nu 1$ is an Abbe number of the first lens and $\nu 2$ is an Abbe number of the second lens.

When the lower limit of the condition (6) is exceeded, it is necessary that both the first and second lenses have strong refractive power in order to remove axial chromatic aberration. Moreover, since other aberrations increase, it is difficult to restrain the aberrations by use of another lens element other than the first and second lenses. When the upper limit of the condition (6) is exceeded, it is necessary that both the first and second lenses have weak refractive power in order to remove axial chromatic aberration. Moreover, since a sufficient refractive power cannot be provided to the front lens unit, it is difficult to realize a compact lens system.

When the first lens is a bi-concave lens, its configuration desirably fulfills the following condition (7):

$$-1.0 < \frac{R1 + R2}{R1 - R2} < 0.5 \quad (7)$$

where R1 is a radius of curvature of the object side surface of the first lens (hereinafter referred to as first surface) and R2 is a radius of curvature of the image side surface of the first lens (hereinafter referred to as second surface).

When the lower limit of the condition (7) is exceeded, the position of a principal point of the first lens moves toward the object side, so that negative refractive power substantially increases. As a result, the total length of the lens system increases. When the upper limit of the condition (7) is exceeded, the position of the principal point moves toward the image side, so that negative refractive power is substantially too weak. As a result, it is difficult to restrain field curvature.

The configuration of the positive second lens desirably fulfills the following condition (8):

$$-0.2 < \frac{R3 + R4}{R3 - R4} < -1.5 \tag{8}$$

where R3 is a radius of curvature of the object side surface of the second lens (hereinafter referred to as third surface) and R4 is a radius of curvature of the image side surface of the second lens (hereinafter referred to as fourth surface).

When the upper limit of the condition (8) is exceeded, the distance between the second and third lenses substantially decreases since the position of a principal point of the second lens moves toward the image side, so that a Petzval sum increases. As a result, field curvature cannot sufficiently be corrected. When the lower limit of the condition (7) is exceeded, the curvature of the third surface is too large. As a result, it is difficult to manufacture the lens.

Figure 13:
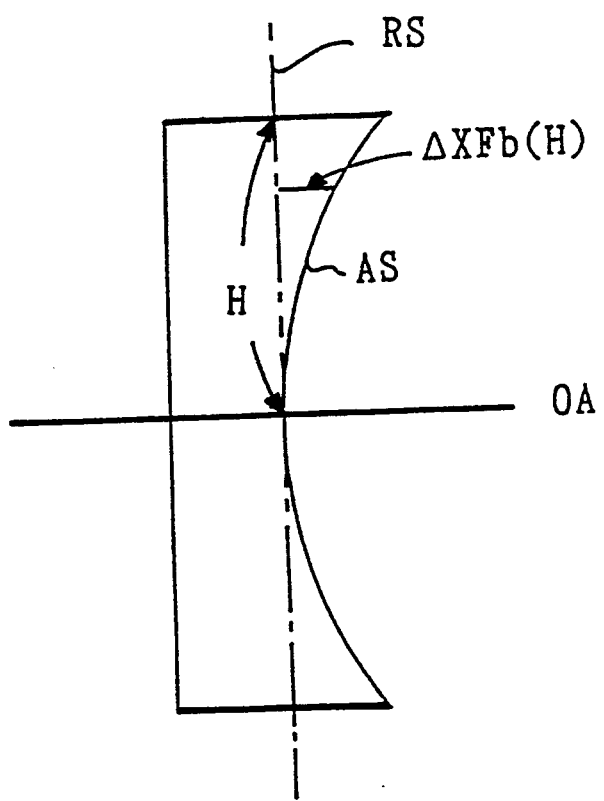
FIG. 13 is a view for explaining a deviation amount of an aspherical surface relative to a reference surface.

It is desirable to provide an aspherical surface as described in the following in the front lens unit: Positive refractive power is allotted to the second lens in the front lens unit since the first lens has a negative refractive power. Because of this power arrangement, an inclination of spherical aberration toward the under side increases, and coma is apt to be generated since lower light beams of off-axial light makes a large leap. In order to correct it, it is desirable to provide in the front lens unit an aspherical surface whose negative refractive power increases gradually from the center to the edge along the height. It is further desirable to employ for a surface proximate to an aperture the aspherical surface whose negative refractive power increases gradually from the center to the edge along the height. A deviation amount of the aspherical surface from a reference spherical surface desirably fulfills the following conditions (9) and (10).

$$0.5 \times 10^{-5} < \frac{\Delta XFb(HZ)}{F} < 0.2 \times 10^{-3} \tag{9}$$

$$0.2 \times 10^{-3} < \frac{\Delta XFb(HM)}{F} < 0.3 \times 10^{-2} \tag{10}$$

where $\Delta XFb(H)$ is, as shown in FIG. 13, a deviation amount (a deviation amount on the image side is represented by a positive value), of an aspherical surface AS whose negative refractive power increases from the center to the edge gradually along the height, from a reference spherical surface RS at a position a distance H away from the optical axis OA, HZ=0.4 Hmax and HM=0.8 Hmax (Hmax is an effective aperture of a surface), and F is a focal length of the entire lens system.

When the lower limits of the conditions (9) and (10) are exceeded, an inclination of spherical aberration toward the under side is so large that it is difficult to correct it. When the upper limits of the conditions (9) and (10) are exceeded, an inclination of spherical aberration toward the over side is so large due to the aspherical surface that it is difficult to correct it by use of another surface.

In a case where spherical aberration is corrected in the front lens unit (for example, in a case where aberration adjustment is made in the front lens unit to perform focusing by moving the front lens unit or in a case where no aspherical surfaces are employed in the rear lens unit), it is desirable to employ for the front lens unit one more aspherical surface which functions to decrease negative refractive power. It is further desirable to employ for the object side surface of a lens element proximate to an aperture an aspherical surface which fulfills the following conditions (11) and (12):

$$0.50 \times 10^{-5} < \frac{\Delta XFa(HZ)}{F} < 0.15 \times 10^{-3} \tag{11}$$

$$0.20 \times 10^{-3} < \frac{\Delta XFa(HM)}{F} < 0.40 \times 10^{-2} \tag{12}$$

where $\Delta XFa(H)$ is a deviation amount (a deviation amount on the image side is represented by a positive value), of an aspherical surface whose negative refractive power decreases gradually from the center to the edge along the height, from a reference spherical surface at a position a distance H away from the optical axis. Thus, $\Delta XFa(H)$ is defined similarly to $\Delta XFb(H)$ having been described with reference to FIG. 13.

When the lower limits of the conditions (11) and (12) are exceeded, it is difficult to restrain an inclination of spherical aberration toward the over side in the front lens unit. When the upper limits of the conditions (11) and (12) are exceeded, an inclination of spherical aberration toward the under side is so large that it is impossible to sufficiently correct it by use of another surface.

In a case where a bi-aspherical lens element is employed, it is desirable to employ for the third lens a bi-aspherical lens element whose negative refractive power increases gradually from the center to the edge along the height on one surface and decreases gradually from the center to the edge along the height on the other surface. The bi-aspherical lens element desirably fulfills the following conditions (13) and (14):

$$0.1 < \frac{\Delta XFa(HZa)}{\Delta XFb(HZb)} < 2 \tag{13}$$

$$0.1 < \frac{\Delta XFa(HMa)}{\Delta XFb(HMb)} < 2 \tag{14}$$

where HZa=0.4 Hamax and HMa=0.8 Hamax (Hamax is an effective diameter of an aspherical surface whose negative refractive power decreases gradually from the center to the edge along the height), and HZb=0.4 Hbmax and HMb=0.8 Hbmax (Hbmax is an effective aperture of an aspherical surface whose negative refractive power increases gradually from the center to the edge along the height).

When the lower limits of the conditions (13) and (14) are exceeded, an inclination of spherical aberration toward the over side increases. When the upper limits of the conditions (13) and (14) are exceeded, an inclination of spherical aberration toward the under side is too large. In either case, it is difficult to restrain spherical aberration in the front lens unit.

The rear lens unit desirably fulfills the following condition (15):

$$-0.5 < \frac{R(-)}{F} < -0.15 \tag{15}$$

where $R(-)$ is a curvature of the object side surface of the negative lens element.

When the lower limit of the condition (15) is exceeded, field curvature is too large to correct. When the upper limit thereof is exceeded, it is difficult to manufacture the lens.

In a case where the rear lens unit includes two lens elements consisting of a positive and a negative lens elements, the following arrangement is desirable: Since the Petzval sum is sufficiently small in the first lens having a negative refractive power, it is desirable to employ in the rear lens unit an aspherical surface so as to increase positive refractive power in order to return an inclination of an image plane toward the over side in an off-axial portion by means of a higher-order term of the Petzval's condition. It is further desirable to employ on the image side of the positive lens element an aspherical surface whose positive refractive power increases gradually from the center to the edge along the height so that the following conditions (16) and (17) are fulfilled:

$$-0.1 \times 10^{-4} < \frac{\Delta XR(HZ)}{F} < -0.3 \times 10^{-3} \quad (16)$$

$$-0.3 \times 10^{-3} < \frac{\Delta XR(HM)}{F} < -0.8 \times 10^{-2} \quad (17)$$

where $\Delta XR(H)$ is a deviation amount (a deviation amount on the image side is represented by a positive value) from a reference spherical surface at a position a distance H away from the optical axis.

When the upper limits of the conditions (16) and (17) are exceeded, it is impossible to restrain an inclination of field curvature toward the over side. When the lower limits thereof are exceeded, field curvature and spherical aberration are over-corrected, so that their inclinations toward the under side increase. As a result, it is difficult to correct them by use of another surface.

The refractive power of the positive lens element of the rear lens unit desirably fulfills the following condition (18):

$$0.05 < \frac{\phi(+)}{\phi} < 2.0 \quad (18)$$

where $\phi(+)$ is a refractive power of the positive lens element of the rear lens unit and $\phi$ is a refractive power of the entire lens system.

When the lower limit of the condition (18) is exceeded, it is impossible to restrain an inclination of field curvature toward the over side. When the upper limit thereof is exceeded, the refractive power of the rear lens unit is so strong that the total length of the lens system increases.

In a case where no aspherical surfaces are employed in the rear lens unit, the positive lens element of the rear lens unit is desirably a meniscus lens element convex to the object side. This is because field curvature can be restrained to reduce the total length of the lens system.

In a case where the rear lens unit includes only one lens element which is a negative lens, the negative lens is desirably a negative meniscus lens having a concave object side surface with a large curvature.

In order to restrain field curvature, it is desirable to employ at least one aspherical surface. Further, the image side surface is desirably aspherical. At this time, the aspherical surface is desirably arranged so that negative refractive power increases in a portion comparatively close to the optical axis and decreases in a portion at a distance from the optical axis.

With this arrangement, it is possible to prevent field curvature from inclining toward the under side in a middle off-axial portion and from rapidly inclining toward the over side in the vicinity of the most off-axial portion.

Further, the following conditions (19) and (20) are desirably fulfilled:

$$0.9 < d/F < 1.3 \quad (19)$$

$$0.25 < b/F < 0.65 \quad (20)$$

where d represents the total length of the entire lens system, F represents the focal length of the entire lens system, and b represents the back focal length of the entire lens system.

When the lower limit of the condition (19) is exceeded, a refractive power of each lens element is so strong that aberrations cannot be sufficiently corrected and it is difficult to maintain enough luminance at peripheral area of an image plane. When the upper limit of the condition (19) is exceeded, the total length of the lens system increases.

When the lower limit of the condition (20) is exceeded, a diameter of the last lens element becomes large. When the upper limit of the condition (20) is exceeded, the total length of the lens system increases.

A compact lens system can be realized with an arrangement where a lens unit having a positive refractive power is arranged in front of an aperture and a lens unit having a negative or a weakly positive refractive power is arranged behind an aperture, that is, a symmetrical lens arrangement of the telephoto type or a type similar to the telephoto type where a rear lens unit have a weakly positive refractive power.

In an optical system of this type, when the most object side lens element is a positive lens, an arrangement of the front lens unit which is desirable from the viewpoint of aberration correction is what is called a triplet type and a tessar type including three or four lens elements consisting of, from the object side, a positive meniscus lens convex to the object side, a negative lens and a positive lens or a positive doublet lens. With this lens arrangement, however, the Petzval sum increases toward the positive side, so that field curvature increases. Further, a sagittal image plane inclines toward the under side in a middle off-axial portion of an image plane and largely inclines toward the over side in the periphery of the image plane. If astigmatic difference in a middle off-axial portion of the image plane is eliminated by controlling a meridional image plane, astigmatic difference in the periphery of the image plane increases. Conversely, if astigmatic difference in the periphery is corrected, the astigmatic difference in a middle off-axial portion increases. From this fact, it is understood that a lens arrangement where the most object side lens element is a positive lens is not suitable for increasing an angle of view of a lens system since it is difficult to correct field curvature and astigmatic difference.

In order to solve this problem, according to the present invention, a negative lens concave to the object side is employed for the most object side lens element of the front lens unit. With this arrangement, an increase in the Petzval sum toward the positive side can be decreased, so that an inclination of field curvature toward the under side and astigmatic difference in the periphery of an image plane can be decreased. Further, since an incident angle, of off-axial light in the most periphery which light is incident onto the first lens at a large angle, to the second and succeeding lens elements can be reduced by the negative lens element, correction of other aberrations is also facilitated. For this reason, a high performance can be realized with respect to the entire view angle range. In a case where the most object side lens element is a negative lens, although it is disadvantageous in reducing the total length of the lens system, it is possible to realize a compact lens system by providing a sufficiently strong negative refractive power to the image side lens element.

In a compact lens system having a wide angle of view, one problem is that the quantity of peripheral light is insufficient. However, it is possible to obtain a sufficient quantity of peripheral light by moving a pupil position toward the object side by providing a concave surface to the object side surface of the first lens.

Numerical data of the first to sixth embodiments of the present invention are shown in Tables 1 to 6.

In each table, ri (i=1,2,3, ... ) represents a radius of curvature of an ith lens surface counted from the object side, di (i=1,2,3, ... ) represents an ith axial distance counted from the object side, Ni (i=1,2,3, ... ) and $\nu$i (i=1,2,3, ... ) represent a refractive index and an Abbe number, to the d-line, of an ith lens counted from the object side, respectively, F represents a focal length of the entire lens system, and FNo represents a minimum F number.

In the tables, the asterisks show that the surfaces are aspherical. The aspherical surfaces are defined by the following equation:

$$f(r) = \frac{C0 \cdot r^2}{1 + \sqrt{1 - \epsilon \cdot C0^2 \cdot r^2}} + \sum_{i=2}^{16} A_i r^i$$

where f(r) is a surface configuration of an aspherical surface, r is a height in a direction perpendicular to the optical axis, C0 is a radius of curvature at the vertex of a surface, $\epsilon$ is a conic constant, and $A_2$ to $A_{16}$ are aspherical coefficients.

FIGS. 1, 3, 5, 7, 9 and 11 show lens arrangements of the first to sixth embodiments.

The first embodiment comprises from the object side: a front lens unit including a negative bi-concave lens element, a positive bi-convex lens element and a negative meniscus lens element concave to the image side; an aperture S; and a rear lens unit including a positive meniscus lens element convex to the image side and a negative meniscus lens element concave to the object side.

The image side surface of the negative meniscus lens element of the front lens unit and the image side surface of the positive meniscus lens element of the rear lens unit are aspherical.

The second and third embodiments comprise from the object side: a front lens unit including a negative bi-concave lens element, a positive meniscus lens element convex to the object side and a negative meniscus lens element concave to the image side; an aperture S; and a rear lens unit including a positive bi-convex lens element and a negative meniscus lens element concave to the object side.

The image side surface of the negative meniscus lens element of the front lens unit and the image side surface of the positive lens element of the rear lens unit are aspherical.

The fourth embodiment comprises from the object side: a front lens unit including a negative bi-concave lens element; a positive bi-convex lens element and a negative meniscus lens element concave to the object side; an aperture S; and a rear lens unit including a positive meniscus lens element convex to the object side and a negative meniscus lens element concave to the object side.

The both side surfaces of the negative meniscus lens element of the front lens unit are aspherical.

The fifth embodiment comprises from the object side: a front lens unit including a negative bi-concave lens element, a positive bi-convex lens element and a positive meniscus lens element convex to the object side; an aperture S; and a rear lens unit including a positive meniscus lens element convex to the image side and a negative meniscus lens element concave to the object side.

The image side surface of the positive meniscus lens element of the front lens unit is aspherical.

The sixth embodiment comprises from the object side: a front lens unit including a negative bi-concave lens element, a positive bi-convex lens element and a negative meniscus lens element concave to the object side; an aperture S; and a rear lens unit including a negative meniscus lens element concave to the object side.

The both side surfaces of the negative meniscus lens element of the front lens unit and the image side surface of the negative meniscus lens element of the rear lens unit are aspherical.

FIGS. 2A–C, 4A–C, 6A–C, 8A–C, 10A–C, and 12A–C are graphic representations of aberrations of the first to sixth embodiments, respectively. A solid line d shows aberration to the d-line, a dotted line SC shows a sine condition, and a dotted line DM and a solid line DS show astigmatism on a meridional and a sagittal image planes, respectively.

Table 7 shows values of $\phi 1/\phi f$ of the condition (1), values of $\phi F/\phi f$ of the condition (2), values of $\phi R/\phi F$ of the condition (3) and values of $\phi 3/\phi$ of the condition (4) in the first to sixth embodiments. Table 8 shows values of Nd2 of the condition (5), values of $\nu 2 - \nu 1$ of the condition (6), values of $(R1+R2)/(R1-R2)$ of the condition (7) and values of $(R3+R4)/(R3-R4)$ of the condition (8) in the first to sixth embodiments. Table 9 shows values of $R(-)/F$ of the condition (15) and values of $\phi(+)/\phi$ of the condition (18). Table 10 shows values of d/F of the condition (19) and values of b/F of the condition (20).

Tables 11 and 12 show values of Dev/F relating to deviation amounts with respect to aspherical surfaces (fifth, sixth and ninth surfaces) corresponding to the conditions (9) to (12), (16) and (17) in the first to sixth embodiments.

Table 13 shows values of Dev/Dev relating to deviation amount ratios with respect to aspherical surfaces corresponding to the conditions (13) and (14) in the embodiments which have bi-aspherical lens elements.

Obviously, many modifications and variations of the present invention are possible in light of the above teachings. It is therefore to be understood that within the scope of the appended claims, the invention may be practiced other than as specifically described.

TABLE 1

| (Embodiment 1) | | | | | | |
|---|---|---|---|---|---|---|
| F = 24.3 | | | | FNo = 3.62 | | |
| Radius of Curvature | | Axial Distance | | Refractive Index | | Abbe Number |
| r1 | −21.760 | d1 | 0.800 | N1 | 1.67339 | $\nu$1 29.25 |
| r2 | 24.698 | d2 | 0.100 | | | |
| r3 | 7.753 | d3 | 3.100 | N2 | 1.80100 | $\nu$2 46.54 |
| r4 | −103.911 | d4 | 0.500 | | | |

TABLE 1-continued

(Embodiment 1)

F = 24.3, FNo = 3.62

| | Radius of Curvature | Axial Distance | | Refractive Index | | Abbe Number |
|---|---|---|---|---|---|---|
| r5 | 85.119 | d5 | 1.000 | N3 1.64769 | ν3 | 31.23 |
| r6* | 23.151 | d6 | 1.000 | | | |
| r7 | ∞ (aperture) | d7 | 2.600 | | | |
| r8 | −124.403 | d8 | 2.500 | N4 1.80100 | ν4 | 46.54 |
| r9* | −17.443 | d9 | 4.600 | | | |
| r10 | −7.407 | d10 | 1.800 | N5 1.57616 | ν5 | 41.42 |
| r11 | −23.877 | | | | | |

Aspherical Coefficients r6 : $\epsilon = 0.11053 \times 10^2$
$A4 = 0.62583 \times 10^{-3}$
$A6 = 0.25669 \times 10^{-4}$
$A8 = -0.27096 \times 10^{-6}$
$A10 = 0.16181 \times 10^{-7}$
$A12 = -0.28044 \times 10^{-12}$ r9 : $\epsilon = 0.21464 \times 10$
$A4 = 0.19285 \times 10^{-4}$
$A6 = -0.58527 \times 10^{-5}$
$A8 = 0.13369 \times 10^{-6}$
$A10 = -0.20682 \times 10^{-8}$
$A12 = -0.60702 \times 10^{-11}$

TABLE 2

(Embodiment 2)

F = 24.3, FNo = 3.62

| | Radius of Curvature | Axial Distance | | Refractive Index | | Abbe Number |
|---|---|---|---|---|---|---|
| r1 | −32.334 | d1 | 1.000 | N1 1.75000 | ν1 | 25.14 |
| r2 | 33.696 | d2 | 1.500 | | | |
| r3 | 7.872 | d3 | 3.200 | N2 1.80420 | ν2 | 46.50 |
| r4 | 99.501 | d4 | 0.800 | | | |
| r5 | 38.123 | d5 | 1.200 | N3 1.75520 | ν3 | 27.51 |
| r6* | 15.792 | d6 | 1.000 | | | |
| r7 | ∞ (aperture) | d7 | 2.500 | | | |
| r8 | 95.042 | d8 | 2.700 | N4 1.58340 | ν4 | 30.23 |
| r9* | −12.500 | d9 | 4.200 | | | |
| r10 | −7.246 | d10 | 1.800 | N5 1.75000 | ν5 | 25.14 |
| r11 | −23.669 | | | | | |

Aspherical Coefficients r6 : $\epsilon = 0.89754$
$A4 = 0.70434 \times 10^{-3}$
$A6 = 0.20842 \times 10^{-4}$
$A8 = -0.36425 \times 10^{-9}$
$A10 = 0.16022 \times 10^{-7}$
$A12 = -0.74142 \times 10^{-12}$ r9 : $\epsilon = 0.24876 \times 10$
$A4 = -0.84444 \times 10^{-5}$
$A6 = -0.50966 \times 10^{-5}$
$A8 = 0.81658 \times 10^{-7}$
$A10 = -0.27333 \times 10^{-8}$
$A12 = 0.59440 \times 10^{-11}$

TABLE 3

(Embodiment 3)

F = 24.3, FNo = 3.62

| | Radius of Curvature | Axial Distance | | Refractive Index | | Abbe Number |
|---|---|---|---|---|---|---|
| r1 | −38.318 | d1 | 1.200 | N1 1.75000 | ν1 | 25.14 |
| r2 | 30.090 | d2 | 1.000 | | | |
| r3 | 8.045 | d3 | 3.000 | N2 1.80100 | ν2 | 46.54 |
| r4 | 135.821 | d4 | 1.000 | | | |
| r5 | 125.864 | d5 | 1.000 | N3 1.58340 | ν3 | 30.23 |
| r6* | 17.063 | d6 | 1.000 | | | |
| r7 | ∞ (aperture) | d7 | 2.600 | | | |
| r8 | 77.417 | d8 | 2.500 | N4 1.58340 | ν4 | 30.23 |
| r9* | −11.179 | d9 | 4.200 | | | |
| r10 | −7.309 | d10 | 1.800 | N5 1.75000 | ν5 | 25.14 |
| r11 | −23.526 | | | | | |

Aspherical Coefficients r6 : $\epsilon = 0.11112 \times 10^2$
$A4 = 0.59605 \times 10^{-3}$
$A6 = 0.19307 \times 10^{-4}$
$A8 = -0.22686 \times 10^{-6}$
$A10 = 0.16149 \times 10^{-7}$
$A12 = -0.37848 \times 10^{-12}$ r9 : $\epsilon = 0.21325 \times 10$
$A4 = -0.13427 \times 10^{-5}$
$A6 = -0.42970 \times 10^{-5}$
$A8 = 0.52512 \times 10^{-7}$
$A10 = -0.17889 \times 10^{-8}$
$A12 = 0.13792 \times 10^{-11}$

TABLE 4

(Embodiment 4)

F = 24.3, FNo = 4.62

| | Radius of Curvature | Axial Distance | | Refractive Index | | Abbe Number |
|---|---|---|---|---|---|---|
| r1 | −14.175 | d1 | 0.900 | N1 1.67339 | ν1 | 29.25 |
| r2 | 67.471 | d2 | 0.700 | | | |
| r3 | 7.611 | d3 | 2.800 | N2 1.80420 | ν2 | 46.50 |
| r4 | −87.028 | d4 | 0.800 | | | |
| r5* | −17.544 | d5 | 1.400 | N3 1.84666 | ν3 | 23.62 |
| r6* | −25.641 | d6 | 1.800 | | | |
| r7 | ∞ (aperture) | d7 | 1.800 | | | |
| r8 | 12.092 | d8 | 1.400 | N4 1.77250 | ν4 | 49.77 |
| r9 | 12.660 | d9 | 3.500 | | | |
| r10 | −5.714 | d10 | 1.000 | N5 1.65446 | ν5 | 33.72 |
| r11 | −8.392 | | | | | |

Aspherical Coefficients r5 : $\epsilon = -0.48009 \times 10$
$A4 = 0.28402 \times 10^{-3}$
$A6 = 0.30420 \times 10^{-4}$
$A8 = -0.17113 \times 10^{-5}$
$A10 = 0.34253 \times 10^{-7}$
$A12 = 0.76699 \times 10^{-10}$ r6 : $\epsilon = -0.17925 \times 10$
$A4 = 0.92843 \times 10^{-3}$
$A6 = 0.34757 \times 10^{-4}$
$A8 = -0.13415 \times 10^{-5}$
$A10 = 0.21137 \times 10^{-7}$
$A12 = 0.16438 \times 10^{-10}$

TABLE 5

(Embodiment 5)

F = 24.3, FNo = 4.62

| | Radius of Curvature | Axial Distance | | Refractive Index | | Abbe Number |
|---|---|---|---|---|---|---|
| r1 | −14.897 | d1 | 0.900 | N1 1.67339 | ν1 | 29.25 |
| r2 | 22.902 | d2 | 0.300 | | | |
| r3 | 9.018 | d3 | 2.400 | N2 1.80420 | ν2 | 46.50 |
| r4 | −31.542 | d4 | 0.500 | | | |
| r5 | 21.724 | d5 | 1.600 | N3 1.84666 | ν3 | 23.62 |
| r6* | 23.711 | d6 | 1.400 | | | |
| r7 | ∞ (aperture) | d7 | 2.200 | | | |
| r8 | −7.931 | d8 | 1.500 | N4 1.80100 | ν4 | 46.54 |
| r9 | −6.908 | d9 | 4.000 | | | |
| r10 | −6.100 | d10 | 1.200 | N5 1.67339 | ν5 | 29.25 |
| r11 | −9.977 | | | | | |

Aspherical Coefficients r6 : $\epsilon = 0.15017 \times 10^2$
$A4 = 0.18997 \times 10^{-3}$
$A6 = 0.59954 \times 10^{-4}$
$A8 = -0.32146 \times 10^{-5}$
$A10 = 0.17821 \times 10^{-7}$
$A12 = 0.29365 \times 10^{-11}$

TABLE 6

(Embodiment 6)

F = 28.0, FNo = 4.62

| | Radius of Curvature | Axial Distance | | Refractive Index | | Abbe Number |
|---|---|---|---|---|---|---|
| r1 | −21.233 | d1 | 1.153 | N1 1.64769 | ν1 | 31.23 |
| r2 | 37.825 | d2 | 0.807 | | | |
| r3 | 8.352 | d3 | 3.690 | N2 1.77250 | ν2 | 49.77 |
| r4 | −75.858 | d4 | 0.923 | | | |
| r5* | −13.184 | d5 | 1.614 | N3 1.84666 | ν3 | 23.62 |
| r6* | −15.758 | d6 | 1.269 | | | |
| r7 | ∞ (aperture) | d7 | 7.842 | | | |
| r8 | −6.649 | d8 | 1.845 | N4 1.58340 | ν4 | 30.23 |
| r9* | −10.319 | | | | | |

Aspherical Coefficients r5 : $\epsilon = 0.21890 \times 10$
$A4 = 0.11941 \times 10^{-3}$
$A6 = 0.27480 \times 10^{-4}$
$A8 = -0.52443 \times 10^{-6}$
$A10 = 0.45205 \times 10^{-9}$
$A12 = 0.10787 \times 10^{-11}$ r6 : $\epsilon = 0.10098 \times 10^2$
$A4 = 0.63867 \times 10^{-3}$
$A6 = 0.40871 \times 10^{-4}$
$A8 = -0.61606 \times 10^{-6}$
$A10 = 0.43646 \times 10^{-8}$
$A12 = -0.19069 \times 10^{-12}$ r9 : $\epsilon = 0.53513$
$A4 = 0.77745 \times 10^{-4}$
$A6 = -0.68463 \times 10^{-5}$
$A8 = 0.15725 \times 10^{-6}$
$A10 = -0.20548 \times 10^{-8}$ TABLE 6-continued (Embodiment 6)

F = 28.0    FNo = 4.62

| Radius of Curvature | Axial Distance | Refractive Index | Abbe Number |
|---|---|---|---|
| $A12 = 0.80756 \times 10^{-11}$ | | | |

TABLE 7

| | $\frac{\phi 1}{\phi f}$ | $\frac{\phi F}{\phi f}$ | $\frac{\phi R}{\phi F}$ | $\frac{\phi 3}{\phi}$ |
|---|---|---|---|---|
| Embodiment 1 | 0.8787 | −0.6229 | −0.1019 | −0.491 |
| Embodiment 2 | 1.4960 | −0.7346 | −0.0615 | −0.664 |
| Embodiment 3 | 1.5917 | −0.6578 | 0.1553 | −0.715 |
| Embodiment 4 | 0.5581 | −0.9139 | −0.4562 | −0.034 |
| Embodiment 5 | 0.4986 | −0.6633 | −0.2701 | −0.108 |
| Embodiment 6 | 0.5298 | −1.0469 | −0.5061 | −0.209 |

TABLE 8

| | Nd2 | $\nu 2 - \nu 1$ | $\frac{R1 + R2}{R1 - R2}$ | $\frac{R3 + R4}{R3 - R4}$ |
|---|---|---|---|---|
| Embodiment 1 | 1.801 | 17.29 | −0.0632 | −0.861 |
| Embodiment 2 | 1.804 | 21.36 | −0.0206 | −1.171 |
| Embodiment 3 | 1.801 | 17.29 | 0.1202 | −1.125 |
| Embodiment 4 | 1.804 | 17.25 | −0.6407 | −0.839 |
| Embodiment 5 | 1.804 | 17.25 | −0.2117 | −0.555 |
| Embodiment 6 | 1.772 | 18.54 | −0.2809 | −0.801 |

TABLE 9

| | $\frac{R(-)}{F}$ | $\frac{\phi(+) \text{ of Positive Lens of Rear Component}}{\phi}$ |
|---|---|---|
| Embodiment 1 | −0.305 | 0.9685 |
| Embodiment 2 | −0.298 | 1.270 |
| Embodiment 3 | −0.301 | 1.434 |
| Embodiment 4 | −0.235 | 0.1444 |
| Embodiment 5 | −0.251 | 0.5997 |
| Embodiment 6 | −0.237 | — |

TABLE 10

| | $\frac{d}{F}$ | $\frac{b}{F}$ |
|---|---|---|
| Embodiment 1 | 1.111 | 0.370 |
| Embodiment 2 | 1.181 | 0.361 |
| Embodiment 3 | 1.165 | 0.370 |
| Embodiment 4 | 1.104 | 0.441 |
| Embodiment 5 | 1.170 | 0.511 |
| Embodiment 6 | 1.110 | 0.426 |

TABLE 11

| | Dev of Fifth Surface / F | | Dev of Sixth Surface / F | |
|---|---|---|---|---|
| | 0.4Hmax | 0.8Hmax | 0.4Hmax | 0.8Hmax |
| Embodiment 1 | — | — | $0.62 \times 10^{-4}$ | $0.10 \times 10^{-2}$ |
| Embodiment 2 | — | — | $0.57 \times 10^{-4}$ | $0.10 \times 10^{-2}$ |
| Embodiment 3 | — | — | $0.68 \times 10^{-4}$ | $-0.12 \times 10^{-2}$ |
| Embodiment 4 | $0.58 \times 10^{-4}$ | $0.11 \times 10^{-2}$ | $0.64 \times 10^{-4}$ | $-0.11 \times 10^{-2}$ |
| Embodiment 5 | — | — | $0.14 \times 10^{-4}$ | $0.31 \times 10^{-3}$ |
| Embodiment 6 | $0.18 \times 10^{-4}$ | $0.67 \times 10^{-3}$ | $0.28 \times 10^{-4}$ | $0.59 \times 10^{-3}$ |

TABLE 12

| | Dev of Ninth Surface / F | |
|---|---|---|
| | 0.4Hmax | 0.8Hmax |
| Embodiment 1 | $-0.27 \times 10^{-4}$ | $-0.11 \times 10^{-2}$ |
| Embodiment 2 | $-0.11 \times 10^{-3}$ | $-0.28 \times 10^{-2}$ |
| Embodiment 3 | $-0.11 \times 10^{-3}$ | $-0.27 \times 10^{-2}$ |

TABLE 13

| | Dev of Fifth Surface / Dev of Sixth Surface | |
|---|---|---|
| | 0.4Hmax | 0.8Hmax |
| Embodiment 4 | 0.91 | 1.0 |
| Embodiment 6 | 0.64 | 1.13 |

What is claimed is:

1. A single focal length lens system comprising:

a plurality of lens elements including a first negative lens element, disposed at an object side end of the lens system, whose object side surface is concave; and a last negative lens element disposed at an image side end of the lens system, said negative lens element having an air space between a previous lens element disposed at the object side of the last negative lens element;

and wherein the lens system fulfills the following condition:

$$0.3 < \frac{\phi 1}{\phi f} < 1.7$$

wherein;

$\phi f$ represents the refractive power of the first negative lens element; and $\phi 1$ represents the refractive power of the last negative lens element.

2. A single focal length lens system claimed in claim 1, wherein the lens system further fulfills the following condition:

$$0.9 < d/F < 1.3$$

wherein;

d represents the total length of the lens system; and
F represents the focal length of the lens system.

3. A single focal length lens system claimed in claim 1, wherein the lens system further fulfills the following condition:

$$0.25 < b/F < 0.65$$

wherein;

b represents the back focal length of the lens system.

4. A single focal length lens system claimed in claim 1, wherein the lens system further fulfills the following conditions:

$$-2.8 < \frac{\phi F}{\phi f} < -0.1$$

$$-1.2 < \frac{\phi R}{\phi F} < 0.4$$

wherein;

$\phi F$ represents the total refractive power of the lens elements disposed at the object side of an aperture stop; and $\phi R$ represents the total refractive power of the lens elements disposed at the image side of the aperture stop.

5. A single focal length lens system claimed in claim 1, wherein the lens system includes a second positive lens element and a third lens element both of which disposed at the image side of the first negative lens element, and fulfills the following condition:

$$-1.2 < \frac{\phi 3}{\phi} < 0.5$$

wherein;

$\phi 3$ represents the refractive power of the third lens element; and $\phi$ represents the total refractive power of the lens system.

6. A single focal length lens system claimed in claim 1, wherein the lens system fulfills the following condition:

$$-1.0 < \frac{R1 + R2}{R1 - R2} < 0.5$$

wherein;

R1 represents the radius of curvature of an object side surface of the first negative lens element; and R2 represents the radius of curvature of an image side surface of the first negative lens element.

7. A single focal length lens system claimed in claim 1, wherein the lens system includes a second positive lens element disposed at the image side of the first lens element and fulfills the following condition:

$$-0.2 < \frac{R3 + R4}{R3 - R4} < -1.5$$

wherein;

R3 represents the radius of curvature of an object side surface of the second positive lens element; and R2 represents the radius of curvature of an image side surface of the second positive lens element.

8. A single focal length lens system claimed in claim 1, wherein an aperture stop is disposed in the lens system, and the lens system has an aspherical surface in a lens element disposed at the object side of the aperture stop.

9. A single focal length system claimed in claim 1, wherein the lens system fulfills the following condition:

$$-0.5 < \frac{R(-)}{F} < -0.15$$

wherein;

R(−) represents the radius of curvature of an object side surface of the last negative lens element; and F represents the focal length of the lens system.

10. A single focal length lens system claimed in claim 1, wherein the lens system includes a second positive lens element disposed at the image side of the first lens element and fulfills the following condition:

$$10 < \nu 2 - \nu 1 < 30$$

wherein;

$\nu 1$ represents the Abbe number of the first negative lens element; and $\nu 2$ represents the Abbe number of the second positive lens element.

11. A single focal length lens system claimed in claim 1, wherein the lens system includes a second positive lens element disposed at the image side of the first lens element and fulfills the following condition:

$$1.6 < Nd2$$

wherein;

Nd2 represents the refractive index of the second positive lens element.

12. A single focal length lens system comprising:

a first negative lens element, disposed at an object side end of the lens system, whose object side surface is concave;

a second positive lens element disposed at an image side of the first negative lens element; and a last negative lens element disposed at an image side end of the lens system;

and wherein the lens system fulfills the following conditions:

$$10 < \nu 2 - \nu 1 < 30$$

$$1.6 < Nd2$$

wherein;

$\nu 1$ represents the Abbe number of the first negative lens element;

$\nu 2$ represents the Abbe number of the second positive lens element; and

Nd2 represents the refractive index of the second positive lens element.

13. A single focal length lens system claimed in claim 12, wherein the lens system further fulfills the following condition:

$$0.9 < d/F < 1.3$$

wherein;

d represents the total length of the lens system; and

F represents the focal length of the lens system.

14. A single focal length lens system claimed in claim 12, wherein the lens system further fulfills the following condition:

$$0.25 < d/F < 0.65$$

wherein;

b represents the back focal length of the lens system.

15. A single focal length lens system claimed in claim 12, wherein the lens system includes a third lens element disposed at the image side of the second positive lens element, and fulfills the following condition:

$$-1.2 < \frac{\phi 3}{\phi} < 0.5$$

wherein;

$\phi 3$ represents the refractive power of the third lens element; and $\phi$ represents the total refractive power of the lens system.

16. A single focal length lens system used for an objective lens of a camera, which forms an object image on a film comprising:
   a first negative lens element, disposed at an object side end of the lens system, whose object side surface is concave; and
   a last negative lens element disposed at an image side end of the lens system;
   and wherein the lens system fulfills the following condition:

$$0.3 < \frac{\phi 1}{\phi f} < 1.7$$

wherein;

$\phi f$ represents the refractive power of the first negative lens element; and $\phi 1$ represents the refractive power of the last negative lens element.

17. A single focal length lens system used for an objective lens of a camera, which forms an object image on a film comprising:
   a first lens unit including a first negative lens element, disposed at an object side end of the lens system, whose object side surface is concave;
   a second lens unit including a last negative lens element, disposed at an image side end of the lens system; and
   an aperture stop positioned between the first and second lens unit, wherein the lens system fulfills the following condition:

$$0.3 < \frac{\phi 1}{\phi f} < 1.7$$

wherein:

$\phi f$ represents the refractive power of the first negative lens element; and $\phi 1$ represents the refractive power of the last negative lens element.

18. A single focal length lens system as claimed in claim 17 wherein the first lens unit further includes a positive lens element and the second lens unit further includes a positive lens element that is air spaced from the last negative lens element.

* * * * *